F. W. COY.
Injection Steam-Engines.

No. 153,704.  Patented Aug. 4, 1874.

WITNESSES  INVENTOR
Frank G. Parker  Frederick W. Coy
E. A. Nickerson  pr William Edson Cott

THE GRAPHIC CO. PHOTO-LITH. 39 & 41 PARK PLACE, N.Y.

UNITED STATES PATENT OFFICE.

FREDERICK W. COY, OF BOSTON, MASSACHUSETTS.

IMPROVEMENT IN INJECTION STEAM-ENGINES.

Specification forming part of Letters Patent No. 153,704, dated August 4, 1874; application filed April 24, 1874.

*To all whom it may concern:*

Be it known that I, FREDERICK W. COY, of Boston, in the county of Suffolk and State of Massachusetts, have invented certain new and useful Improvements in Steam-Engines of the class in which the steam is instantaneously generated at each stroke, of which the following is a specification:

My invention consists in a device by which water is admitted from a tank to the interior of the piston, and from thence, at each alternate stroke, to the generators at the ends of the cylinders. Said generators are not intended to hold water, but to be kept constantly hot, so that when water is forced into them from the piston it is instantaneously developed into steam.

Figure 1:
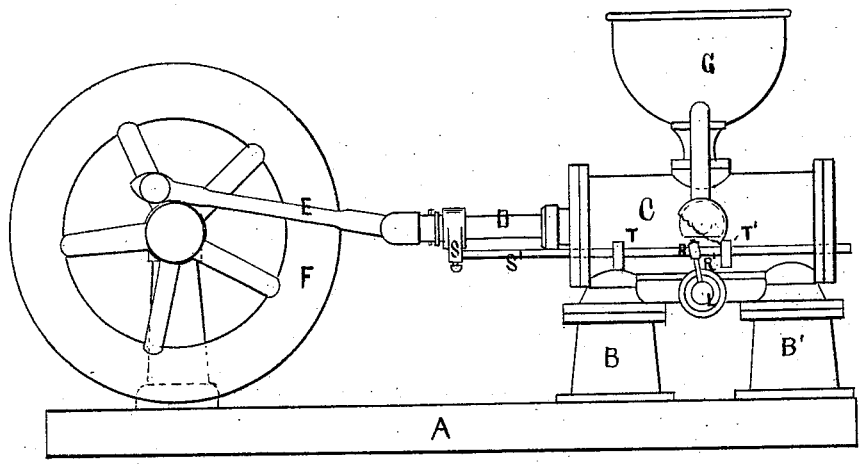
Figure 4:
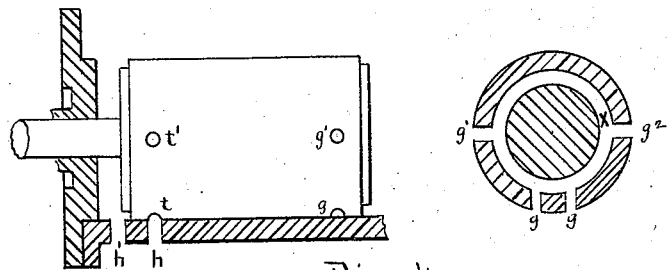
Figures 2, 3, 5:
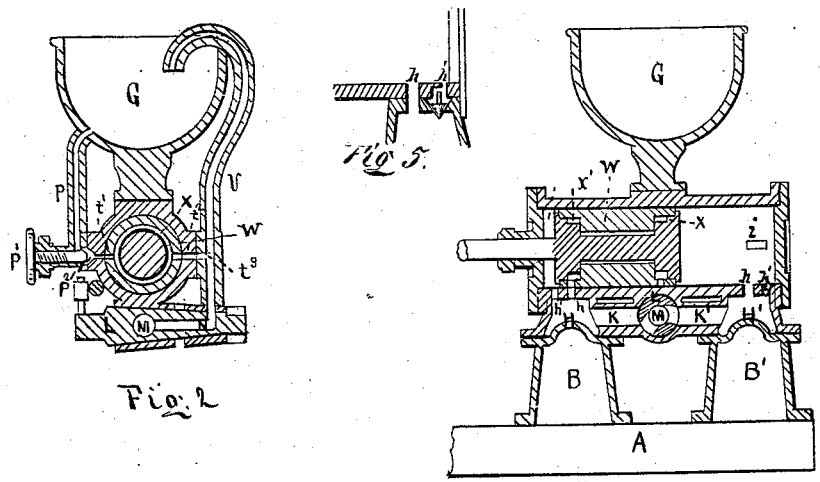

Figure 1 is an elevation of my engine. Fig. 2 is a cross vertical section taken through the center of the cylinder and tank. Fig. 3 is a longitudinal section of the same. Fig. 4 shows the piston and part of the cylinder. Fig. 5 shows in part section the ports $h\ h'$ and an ordinary check-valve in port $h'$.

My invention embodies an engine driven by steam, and yet avoids the use of a boiler.

To accomplish the desired result I place a water-tank, G, at an elevation above the cylinder, and supply it with suitable pipes and valves for admitting the water, with which it is filled through the walls of the cylinder, and into chambers in the ends of the piston, which is so constructed and regulated in its movements that, at the central point, midway between the cylinder-heads of each stroke, one of these chambers at either end is, in case of a double-acting engine, presented to a corresponding opening in the cylinder, at which point it receives a supply of water. This water in the piston is retained until the piston gets to the end of its stroke, where the parts in the cylinder are so arranged, as will be hereafter explained, that the water in the piston-chamber will be forced out by the action of the exhaust steam and thrown into a heated steam-generator, and is there converted into steam, which enters the cylinders and forces the piston back to its original position, when the operation is repeated at the other end of the cylinder.

My object in using two generators with exhaust-ports and valves between is, that the engine will exhaust from the cylinders through the same ports that are employed for injection, and, in case there is more water injected from the chamber than is required to make sufficient steam for the stroke, the action of the engine will open the exhaust-port from that generator and allow the remainder of the steam to escape with the exhaust steam from the cylinder. This prevents any back pressure from an overcharge of water, and avoids the necessity of gaging the charge of water to that nicety that would be required if the exhaust was through a separate channel; consequently, the power is more uniform than would be if only one generator were employed.

Let A represent the base of the engine; F, the balance-wheel; E, the pitman; and D, the piston-rod, all made and constructed in the usual manner. The cylinder C is mounted upon the two heaters, B and B'. These heaters have convex tops or generators H H', as shown in Fig. 3, which are heated by a gas-jet, or by any convenient means. Immediately over these generators I make two ports, $h\ h'$, through one of which, $h$, the water is forced from the piston to the generator. The other port $h'$ is provided with a check-valve, opening from H H', and serves for the steam to escape from the generators to the cylinders and start the piston on its stroke, after which steam can pass through both ports $h$ and $h'$. The piston W is made as shown in section in Figs. 2 and 3, and in elevation in Fig. 4, having an annular interior space, $x\ x'$, Figs. 2 and 3, near each end. Each of these annular spaces is provided with inlet and outlet ports, $t^1\ t^2\ g^1\ g^2$, as shown in Fig. 4, and outlet-ports $t$ and $g$, Fig. 4. The tank G connects with the water-inlet port $P^2$, Fig. 2, by means of the pipe P. This port is opened and closed by the screw-plug valve $P^1$. The annular space $x$ connects through the opening $t^2\ t^3$, Fig. 2, with the exhaust-pipe V, to let off air or steam out of the water-space $x$, so that the water may flow in from the tank G. The exhaust device consists of a coned tube, L, Figs. 1, 2, and 3. This tube has two lateral ports, so arranged that one may be in communication with one of the generating-chambers at each stroke of the piston, the other connection being closed. These are shown in the drawing, Fig. 3. The passage K', from the generator at H', opens into M in the interior of the exhaust-tube L, and thence through the passage N, Fig. 2, and the exhaust-pipe V, while the passage K, from the generator at H, is closed.

The cutting off of the exhaust by lugs T T' on the rod S, which is operated by the piston-rod D through the arm S, upon the movable block R on the arm R', extending from the rocking exhaust-tube L, is for the purpose of contracting or reducing the exhaust-passage, and, by the same operation, releasing the pressure on the generator containing the live or working steam, thus regulating the speed of the engine.

The operation of the machine is as follows: The tank G is filled with water, and the generators H and H' are heated. Let the piston be brought to one end of the cylinder—for instance, as shown in Fig. 3. Now, I open the valve $P^1$, Fig. 2. This allows the water to flow from the tank G through the pipe P into the channel $P^2$, Fig. 2, and thence into the port $g^1$, Fig. 4, filling the annular channel $x$, Fig. 3. Then, by turning the wheel F, Fig. 1, the air in the cylinder is forced out by the movement of the piston W, Figs. 3 and 4, through the port $h$ only, Fig. 3, $h'$ being closed by a check-valve opening only from the generator. Now, when the piston W has arrived at and covered the port $h$, the remainder of the air in that end of the cylinder must pass out through the side ports or grooves $i$, Fig. 3, and ports $g^1$ $g^2$ in the piston, Fig. 4, and water-chambers X, Fig. 3, and ports $g$ $g^1$, Fig. 4, thus forcing the water out of the chamber X into the generator H', Fig. 3, where it is instantly generated into steam. Now, by thus operating the wheel F, the exhaust-port K' is closed. Here the pressure of steam in generator H' will pass through the check-valve port $h'$ and start the piston until the port $h$ is uncovered; then the steam is free to pass through both ports, $h$ and $h'$, into the cylinder, forcing the piston back to the position shown in Fig. 3, the piston carrying sufficient water in chamber X', Fig. 3, which it receives through the port $P^2$, Fig. 2, and delivering, in the same manner as before described, into generator H, Fig. 3, the engine being double-acting. Thus the engine will continue to operate until the water is shut off by the valve $P^2$, Fig. 2, except the exhaust steam is used to force the water out of the chambers X and X', instead of the air, after the first revolution of the wheel in starting the engine.

I claim as my invention—

1. In combination with an injection steam-engine, the tank G, pipe P, and valve $P^1$, arranged to act together with the piston W, substantially as described, and for the purpose set forth.

2. The combination of the cylinder C, constructed with ports $P^2$, $t^3$, $h$, and $h'$, and piston W, constructed with chambers X X' and ports $t^1$, $g^1$, $g^2$, and $g$, all operating together, substantially as described, and for the purpose set forth.

3. The combination of the generators H H', heaters B B', and pipes K K', with the valve L, pipe V, and rod S, all operating substantially as described, and for the purpose set forth.

FREDERICK W. COY.

Witnesses:
WILLIAM EDSON,
FRANK G. PARKER.